US012778166B2

(12) United States Patent
Ley et al.

(10) Patent No.: US 12,778,166 B2
(45) Date of Patent: Nov. 3, 2026

(54) PREPARATION OF DRIED PLANT MATERIAL HAVING AN INCREASED CONTENT OF PHYLLODULCIN

(71) Applicant: SYMRISE AG, Holzminden (DE)

(72) Inventors: Jakob Peter Ley, Holzminden (DE); Esther-Corinna Schwarze, Einbeck (DE); Andreas Ulbrich, Osnabrück (DE); Andreas Theisen, Düsseldorf (DE); Matthias Preusche, Wallenhorst (DE)

(73) Assignee: SYMRISE AG, Holzminden (DE)

( * ) Notice: Subject to any disclaimer, the term of this patent is extended or adjusted under 35 U.S.C. 154(b) by 151 days.

(21) Appl. No.: 18/700,447

(22) PCT Filed: Nov. 4, 2021

(86) PCT No.: PCT/EP2021/080643
§ 371 (c)(1),
(2) Date: Apr. 11, 2024

(87) PCT Pub. No.: WO2023/078553
PCT Pub. Date: May 11, 2023

(65) Prior Publication Data

US 2025/0000127 A1 Jan. 2, 2025

(51) Int. Cl.

| | |
|---|---|
| ***A23L 27/10*** | (2016.01) |
| ***A01G 2/10*** | (2018.01) |
| ***A01G 22/60*** | (2018.01) |
| ***A01G 31/00*** | (2018.01) |
| ***A23L 27/00*** | (2016.01) |

(Continued)

(52) U.S. Cl.
CPC .............. *A23L 27/10* (2016.08); *A01G 31/00* (2013.01); *A23L 27/30* (2016.08); *A23L 27/88* (2016.08); *C05G 1/00* (2013.01); *C05G 5/23* (2020.02); *A01G 2/10* (2018.02); *A01G 22/60* (2018.02)

(58) Field of Classification Search
None
See application file for complete search history.

(56) References Cited

U.S. PATENT DOCUMENTS

| | | | | |
|---|---|---|---|---|
| 2011/0076239 A1* | 3/2011 | Reichelt .................. | A23G 1/32 424/49 |
| 2017/0008813 A1* | 1/2017 | Werner .................... | C05G 5/23 |

(Continued)

FOREIGN PATENT DOCUMENTS

| | | | |
|---|---|---|---|
| EP | 1407679 A1 | 4/2004 |
| JP | H07-050941 A | 2/1995 |

(Continued)

OTHER PUBLICATIONS

International Search Report and Written Opinion issued on Jul. 27, 2022 for corresponding PCT Application No. PCT/EP2021/080643.

(Continued)

*Primary Examiner* — Joshua D Huson
*Assistant Examiner* — Edgar Reyes
(74) *Attorney, Agent, or Firm* — POLSINELLI PC

(57) ABSTRACT

The present invention relates to the cultivation (preferably indoor) of *Hydrangea* species for increased production of phyllodulcin and the provision of a plant material, preferably a dried plant material, having an increased content of phyllodulcin.

19 Claims, 10 Drawing Sheets

(51) Int. Cl.

| | |
|---|---|
| ***A23L 27/30*** | (2016.01) |
| ***C05G 1/00*** | (2006.01) |
| ***C05G 5/23*** | (2020.01) |

(56) References Cited

U.S. PATENT DOCUMENTS

| | | | | |
|---|---|---|---|---|
| 2019/0090438 | A1* | 3/2019 | Letton | A01G 24/15 |
| 2023/0257316 | A1* | 8/2023 | Iannotta | C05G 5/23<br>71/31 |

FOREIGN PATENT DOCUMENTS

| | | | |
|---|---|---|---|
| KR | 101662498 | B1 | 10/2016 |
| WO | 2003/000074 | A1 | 1/2003 |
| WO | 2019065592 | A1 | 4/2019 |

OTHER PUBLICATIONS

Japanese Office Action and English translation issued on Oct. 7, 2025 for corresponding Japanese Application No. 2024-525898.

Marcel Dieter Moll et al.; "Dihydroisocoumarin Content and Phenotyping of *Hydrangea macrophylla* subsp. *serrata* Cultivaras under Different Shading Regimes," Agronomy, vol. 11, 2021; pp. 1-19.

* cited by examiner

PREPARATION OF DRIED PLANT MATERIAL HAVING AN INCREASED CONTENT OF PHYLLODULCIN

CROSS-REFERENCE TO RELATED APPLICATIONS

This application is a national stage application (under 35 U.S.C. § 371) of PCT/EP2021/080643, filed Nov. 4, 2021, which is incorporated herein by reference in its entirety.

The present invention relates to the cultivation (preferably indoor) of *Hydrangea* species for increased production of phyllodulcin and the provision of a plant material, preferably a dried plant material, having an increased content of phyllodulcin.

Consumers generally have a strong preference for foodstuffs or indulgence foods, which have a large amount of high caloric sugar, in particular sucrose (saccharose), glucose, fructose or mixtures thereof, due to the pleasant sweetness and sweetness profile associated therewith. On the other hand, it is generally known that a large content of readily metabolizable carbohydrates causes a steep rise in blood sugar levels, leads to the formation of fat deposits and ultimately can result in health problems such as overweight, obesity, insulin resistance, age-onset diabetes and complications thereof. Another particular aggravating factor is that many of the above-mentioned carbohydrates can also have an adverse effect on dental health, as they are decomposed by specific types of bacteria in the oral cavity into lactic acid, for example, and can attack the enamel of milk teeth or adult teeth (caries).

Therefore, it has long been an objective to reduce the high caloric sugar content of food or beverage products and replace it partly or entirely by other substances that impart a sweet taste or which can positively affect the sweet taste in a low concentration without exhibiting sweet taste itself at these low concentration (taste modulators).

The use of phyllodulcin as taste modulator for sweetener-reduced products, flavoring mixtures for same, and method of producing such products was described in EP 2,298,084-B1.

Phyllodulcin is a natural compound occurring exclusively in subspecies of the plant *Hydrangea macrophylla*. Phyllodulcin cannot be economically produced by chemical synthesis or biotechnological approaches.

The leaves of *Hydrangea macrophylla* are mainly used for preparing tea, particularly Amacha, a sweet tasting Japanese tea, which contains tannins and dihydroisocoumarins including phyllodulcin. The leaves of *Hydrangea macrophylla* are typically used Japan and Korea for ceremonial purposes (Buddhas birthday).

The climate conditions between the origin of *Hydrangea macrophylla* in Southeast Asia and Europe differ significantly. Nevertheless, some *Hydrangea macrophylla* hybrids have been bred to be cultivated as garden plants in Europe. These hybrids are used as decorative plants only and most of them do not exhibit any phyllodulcin presence. Commercial cultivation of *Hydrangea macrophylla* ssp. Amacha outside Japan and Korea is not known to date.

The distribution of dihydroisocoumarins and phyllodulcin in the leaves is strongly dependent on the genotype and less pronounced by environmental conditions. It was found, that wild plants reproduced by free pollination have a phyllodulcin content, which varies from plant to plant (Ujihara, M., et al. (1995). "*Accumulation of Phyllodulcin in Sweet-Leaf Plants of Hydrangea serrata and Its Neutrality in the Defence Against a Specialist Leafmining Herbivore*." Res.

Popul. Ecol. 37 (2): 249-257.) It is still unknown in the state of the art how phyllodulcin is synthesized in the plant and which function it has.

Thus, it is highly favorable to have a method for cultivating certain *Hydrangea macrophylla* species for the industrial production of phyllodulcin.

It was thus a task of the present invention to provide a method for the commercial large-scale cultivation of *Hydrangea macrophylla* species and provision of the plant material for subsequent processing.

This primary task was solved by providing a method, for the preparation of a dried plant material having a content of at least 2.5 wt.-% of phyllodulcin, based on the total amount of the dried plant material, comprising or consisting of the steps of a) providing at least one head and/or shoot cutting of *Hydrangea macrophylla* preferably of the subspecies *serrata*, more preferably selected from the group consisting of the varieties Oamacha, Amacha and Amagi-Amacha, hybrids and breeds thereof, especially the result of a targeted cross between a variety selected from Oamacha, Amacha and Amagi-Amacha with any other variety of *Hydrangea macrophylla;*
b) rooting of the at least one head and/or shoot cutting, preferably in a solid substrate-free, soil-free and/or peat-free substrate;
c) cultivating the at least one rooted head and/or shoot cutting in a hydroponic, aeroponic or fogponic system and, at least once, fertilizing the obtained plant(s) during cultivation by means of an nutrient solution comprising or consisting of 5 to 15 wt.-% nitrogen source, 2 to 10 wt.-% phosphorus source, 5 to 25 wt.-% potassium source and 1 to 20 wt.-% magnesium source in a dosing regime of 5 g up to 250 g per 100 L cultivation water, preferably in a dosing regime of 10 g to 150 g per 100 L cultivation water,
   wherein the cultivation is performed with filtered and/or shaded natural light exposure or filtered and/or shaded natural light exposure with additional artificial lighting, or with artificial lighting;
d) harvesting of the stem and/or leaves from the plant(s) after a cultivation period of 20 to 200 days, preferably of 30 to 120 days, especially preferably of 40 to 80 days;
e) drying the harvested stem and/or leaves at a temperature of 20 to 110° C., preferably at a temperature of 30 to 70° C., especially preferably at a temperature of 40 to 60° C.;
f) obtaining a dried plant material containing at least 2.5 wt.-% by weight of phyllodulcin equivalents, based on the total amount of the dried plant material.

A head or a shoot cutting in terms of the present invention means a part of a *Hydrangea macrophylla* species consisting of the terminal part of the plant including a shooting point. A shoot cutting from *Hydrangea macrophylla* can be obtained from any part of the plant, which is able to reproduce (e.g. having a shooting point). In terms of the present invention it is important that the head and/or shoot-cutting have the ability to root and develop an independent plant.

Especially the species "Amagi Amacha" (Bot. No. 1177) is a cultivar that does not establish well in field cultivation, but can yield very high phyllodulcin values up to 6 wt.-% in the plant dry-matter, when cultivated with a method according to the present invention.

It is advantageous in terms of the present invention to cultivate *Hydrangea macrophylla* ssp. *serrata* species, such as "Oamacha", "Amacha" and "Amagi-Amacha", but also hybrids thereof and targeted crosses combining different species as listed above as parental plants can be cultivated with a method according to the present invention. E.g., a species of *Hydrangea macrophylla* can be crossed with any one of the species of *Hydrangea macrophylla* ssp. *serrata* "Oamacha", "Amacha" and "Amagi-Amacha". The plant varieties "Amacha" and "Amagi-Amacha", as mentioned herein as plant varieties of *Hydrangea macrophylla*, are also known as varieties thunbergii or, respectively, amagiana.

The term "rooting" in terms of the present invention means providing conditions, in which the head and/or shoot cutting provided in step a) is able to develop roots. Once the cutting has developed roots, it is referred to as a plant. The person skilled in the art is well aware of corresponding conditions and how to achieve such conditions in order to enable root growth.

It was observed to be particular advantageous to root the cuttings provided in step a) in a solid substrate-free, soil-free and/or peat-free substrate. The cuttings developed more roots, which also grew faster and thus it is able to provide an established plant in a short time.

"Cultivating" in terms of the present invention means exposing of the cuttings or rooted plants to conditions under which they grow and develop more biomass. The person skilled in the art is well aware of corresponding conditions and how to achieve such conditions in order to enable biomass growth.

The term "filtered and/or shaded natural light exposure" preferably means sunlight which is filtered by e.g. glass or transparent polymeric glass replacer, in particular filtered off from UV-B and UV-A light, and/or intermitted by shading units via white, grey, black, green or other colored shading nets.

An "artificial lighting" can be generated e.g. via classical filament lamps, gas-discharge or metal discharge lamps optionally filtered to reduce UV-B radiation or LED (light emitting diodes) with various spectral widths. The global irradiation should result in at least 50% of photosynthesis active radiation (PAR, between 380 and 780 nm) and in a photosynthetic photon flux density (PPFD) of 25 to 800, preferred 50 to 500, in particular 50 to 250 μmol photons $m^{-2}$ $s^{-1}$. The distribution of the VIS part can be similar to sun light or different to sunlight with higher ratios of red and/or blue and lower intensity of yellow and green wavelengths.

Preferably the cultivation is performed at daily average temperatures between 5° C. and 35° C. and 40% up to 90% relative humidity, more preferably at daily average temperatures between 15° C. and 30° C. and 50% up to 80% relative humidity, in particular preferred at daily average temperatures between 15° C. and 25° C. and 50% up to 75% relative humidity.

A "hydroponic system" is a cultivating system, wherein the plants are cultivated in a peat-free substrate with continuous exposure to a liquid film, whereas an "aeroponic system" is a system, wherein the plants are cultivated in a peat-free substrate, preferably in pon and are supplied regularly with water. A "fogponic" system describes a system, wherein the plants are cultivated in a peat-free substrate with exposure to high humidity or vapor. The water supply of the plants is then conducted via the vapor fraction.

It is particularly preferable to supply the plants during cultivation with all essential nutrients. This is understood by the term "fertilizing" in terms of the present invention. A fertilizer is used with 5 to 15 wt.-% nitrogen source, 2 to 10 wt.-% phosphorus source, 5 to 25 wt.-% potassium source and 1 to 20 wt.-% magnesium source (in each case based on 100 wt. % fertilizer (="nutrient solution")), wherein the term "source" relates to any compound, which can be present in a commercially available fertilizer solution and provide for the corresponding element.

This fertilizer is used in in a dosing regimen of 5 g up to 250 g per 100 L cultivation water, preferably in a dosing regimen of 10 g to 150 g per 100 L cultivation water.

In an especially preferred embodiment of the present invention a 15-7-22 (+6) N—P—K-fertilizer is used, containing 15 wt.-% nitrogen source, 7 wt.-% phosphorus source, 22 wt.-% magnesium source and additional 6 wt.-% magnesium oxide, preferably at a dosing of 65 g per 100 L cultivation water.

The term "harvesting" in terms of the present invention means the removal of the grown plant material from the plant. The harvesting can be done by using the whole or basically the whole plant (such that the plant cannot grow and reproduce any more) or partly by only harvesting parts of the plant, such as e.g. the leaves. In one preferred embodiment, only the upper stems and leaves, especially preferred only the leaves of the plant are harvested.

In the subsequent drying step, the harvested plant material, preferably the harvested leaves, are dried and thus the water removed from the plant material. Preferably, the obtained dry plant material has a remaining water content of maximum 20 wt.-%, preferably 10 wt.-%, especially preferably of maximum 5 wt.-%. Methods for determination of the remaining water content are well known in the art.

Preferably the water content is determined by Loss-on-Drying (LOD) method determined e.g. by a dry-mass balance or thermogravimetry or by Karl Fischer Titration.

Generally, the term "phyllodulcin" describes a chemical compound, which is classified as aglycon. However, in nature, phyllodulcin is often present in form of a glycoside, wherein several glycosides are known in the prior art and to a skilled person. The term "phyllodulcin equivalents" as used herein describes the aglycon as well as the phyllodulcin glycosides. Thus, if an amount of phyllodulcin equivalents is to be determined, both the aglycon as well as the phyllodulcin glycosides are to be considered, each as far as present, but calculated on the base of virtually free phyllodulcin by deglycosylation.

Typical glycosides of phyllodulcin are for example, but not limited to:

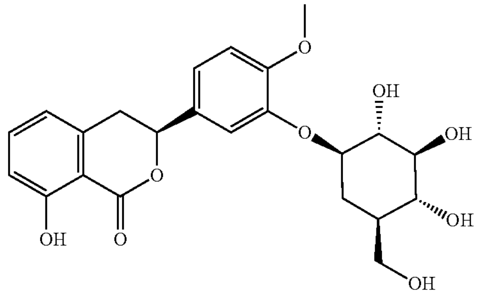

-continued

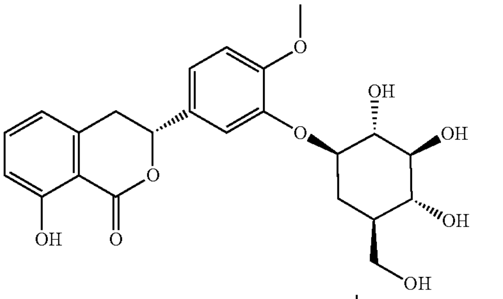

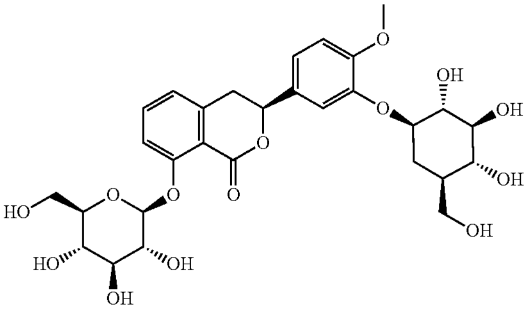

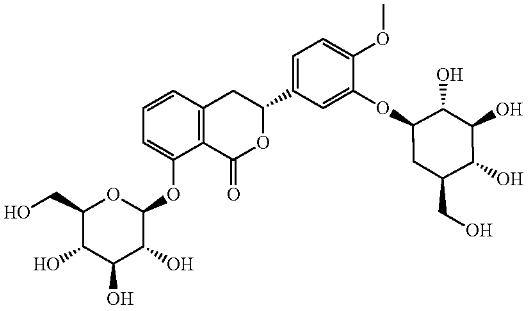

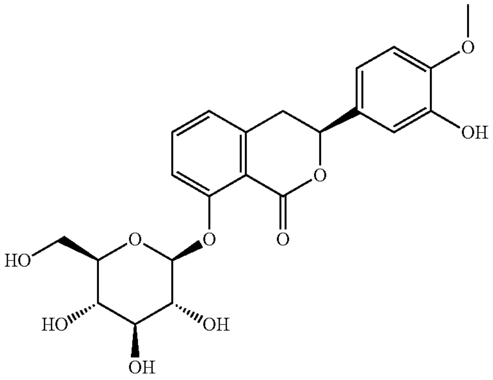

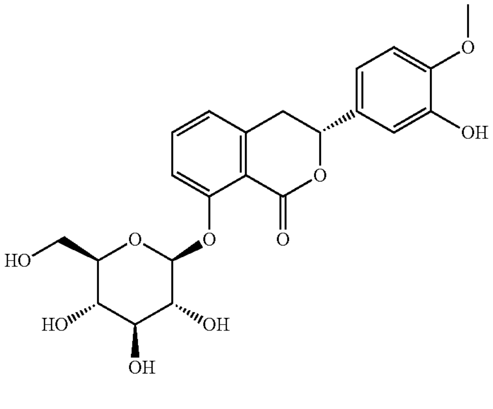

According to another embodiment, preferably, the term "phyllodulcin equivalents" describes a mixture of phyllodulcin enantiomers (and their glycosides), wherein the amount of the enantiomer (2R)-phyllodulcin is higher than each of the amounts of the other enantiomers, particularly preferably higher than the combined amounts of the other enantiomers.

One preferred embodiment relates to the method of the present invention, wherein the plant(s) is/are exposed at least once, preferably several times, during cultivation, to artificial stress conditions, preferably to targeted UV light exposure and/or to chemical stress, especially preferably to jasmonate.

Targeted UV light exposure means a continuous or pulsed exposure of the plants with a certain quality and quantity of UV light in addition to the visible spectrum (400-700 nm), preferred UV-A (400-315 nm) light with 1 to 25%, preferably with 2 to 10% of the whole emission spectrum (UV plus VIS, 315-700 nm), especially preferably in the wavelength range of 340-380 nm for 1-100%, preferably for 10-80%, especially preferably for 50-100% of the cultivation time.

The term "jasmonate" in general describes the lipid-based plant hormone from the group of oxylipids (Avanci N C, Luche D D, Goldman G H, Goldman M H. Jasmonates are phytohormones with multiple functions, including plant defense and reproduction. Genet Mol Res. 2010 Mar. 16; 9 (1): 484-505). Several derivatives of jasmonate are known in the art, e.g. jasmonic acid isomers, methyl jasmonate isomers, 12-oxophytodienoic acid, and jasmonic acid isomers conjugated to some amino acids such as leucine and isoleucine, among other jasmonates, are widespread in the plant kingdom.

One preferred embodiment relates in particular to (−)-(3R,7R,9Z)-jasmonic acid, (+)-(3S,7S,9Z)-jasmonic acid, (+)-(3R,7S,9Z)-epijasmonic acid and (−)-(3S,7R,9Z)-epijasmonic acid and/or their mixtures and/or their respective salts and/or their respective methylesters.

It is especially preferred in terms of the present invention to use methyl jasmonate, preferably (−)-methyl-(3R,7R,9Z)-jasmonate or (+)-methyl-(3S,7S,9Z)-jasmonate or their mixtures.

Another preferred jasmonate derivatives is (−)-methyl-(3R,7R,9Z)-jasmonate, in particular from natural sources such as extracts or essential oils from Jasmine (Jasmine absolue).

It was surprisingly found that the application of jasmonate increases dihydorisocoumarine and in particular the phyllodulcin equivalent content in the leaves of the plants at harvest time. This finding is especially surprising as it is not known, which pathway is signaled inside the plant for dihydorisocoumarine and phyllodulcin synthesis.

Another preferred embodiment relates to a method of the present invention, wherein the exposure of the plant(s) to jasmonate takes place as foliar application and/or via the cultivation water and/or in gaseous form.

"Foliar application" is a method in which the substance is directly applied to the leaves by a syringe or equivalently suitable tools. The jasmonate can also be applied by simply adding the desired amount into the cultivation water or by providing it in gaseous form to the plant.

One preferred embodiment relates to the method of the present invention, wherein the plant(s) is/are exposed at least once, preferably several times, during cultivation, to jasmonate in a total amount of from 0.1 mM to 10 mM.

Yet another preferred embodiment relates to the method according to the present invention, wherein the soil and/or peat-free substrate is selected from vermiculite, rock wool, coconut fiber, perlite, pon, seramis, volcanic ash, volcanic ash granules, *Miscanthus* fiber, zeolith, lava, pumice.

Another preferred embodiment relates to the method according to the present invention, wherein the plant(s) is/are cultivated at a temperature of 15 to 30° C., preferably of 18 to 26° C.

Yet another preferred embodiment relates to a method according to the present invention, wherein the plant(s) is/are cultivated at an artificial illumination time of from 12 to 19 hours to an artificial illumination-free time of from 12 to 5 hours, preferably at an artificial illumination time of from 15 to 17 hours to an artificial illumination-free time of from 7 to 9 hours.

In an especially preferred embodiment of the present invention, the plant(s) is/are cultivated at an artificial illumination time of 16 hours to an artificial illumination-free time of 8 hours.

One preferred embodiment relates to a method according to the present invention, wherein a plurality of plants is cultivated and wherein the plants are cultivated at a planting density of at maximum 25 plants/$m^2$, preferably at a planting density of at maximum 20 plants/$m^2$.

Another preferred embodiment relates to a method according to the invention, wherein the plant(s) is/are cultivated in an ebb and flow, nutrition film, drip irrigation, trickle irrigation, deep water, aeroponic or aquaponics system.

An "ebb and flow" system describes a system, wherein the plants are sequentially exposed to cultivation water from the bottom of the planting trays, followed by a period, wherein the planting trays are not exposed to water.

A "nutrition film" system describes a system, wherein the planting trays are standing in a continuous cultivation water film, which is supplemented by a nutrient solution.

A "drip irrigation" system describes a system, wherein the cultivation water is distributed through a network of valves, pipes, tubing, and emitters directly to a single plant. A "trickle irrigation" system describes a specific embodiment of a drip irrigation system.

A "deep water" system describes a system, wherein the plants are cultivated in cultivation water. That means the planting trays are standing in a tank filled with cultivation water.

One preferred embodiment relates to a method according to the invention, wherein step d) is repeated at least once after a time of at least 20 days after the previous harvest, preferably wherein step d) is repeated two, three, four, five or more times, each after a time of at least 20 days after the previous harvest.

Yet another preferred embodiment relates to a method according to the invention, wherein stem and leaves are harvested in step d), and wherein after drying of the leaf and stem material in step e) the plant material is divided into leaf and stem material, preferably by a method selected from air separation, air floating or sieving, to obtain a plant material, which consists of or comprises at least 75 wt.-%, preferably at least 85 wt.-%, especially preferably at least 95 wt.-% leaf material.

A second aspect of the present invention relates to a dried plant material, preferably obtainable by a method according to the invention, having a content of phyllodulcin equivalents of at least 2.5 wt. %, preferably of at least 3 wt. %, particularly preferably of at least 4 wt. %, based on the total amount of the dried plant material, and/or wherein the dried plant material comprises less than 2.0 wt. %, preferably less than 1.5 wt. %, more preferably less than 1 wt. %, particularly preferably less than 0.5 wt. % of hydrangenol equivalents, based on the total amount of the dried plant material, preferably wherein the dried plant material consists or predominantly consists of leaves.

Generally, the term "hydrangenol" describes a chemical compound, which is classified as aglycon. However, in nature, hydrangenol is often present in form of a glycoside, wherein several glycosides are known in the prior art and to a skilled person. In addition, hydrangenol can also be present as open chain version, so called hydrangeic acid or its glycosides. The term "hydrangenol equivalents" as used herein describes the aglycon as well as the hydrangenol glycosides. Thus, if an amount of hydrangenol equivalents is to be determined, both the aglycon as well as the hydrangenol glycosides are to be considered, each as far as present but calculated on the base of virtually free hydrangenol by deglycosilation.

Typical glycosides of hydrangenol are for example, but not limited to:

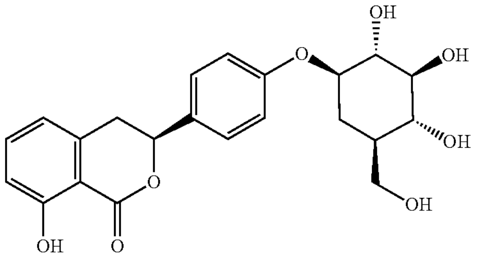

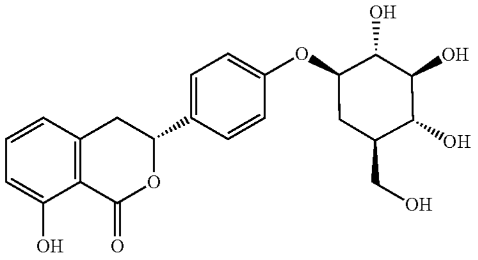

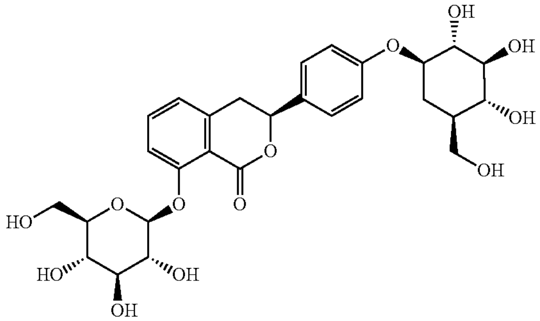

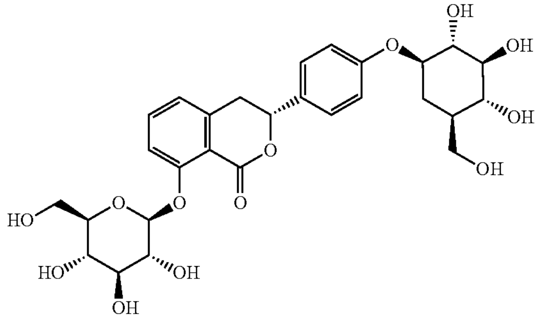

-continued

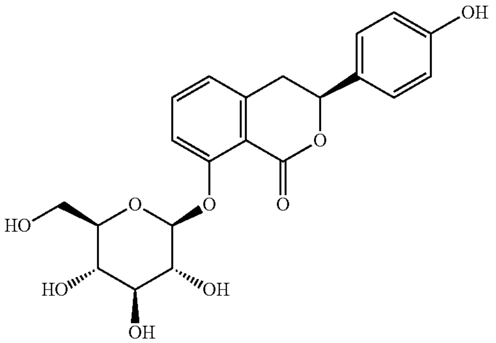

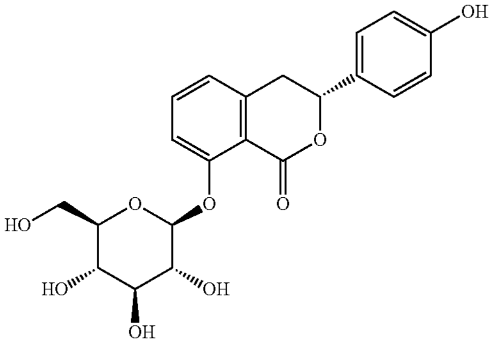

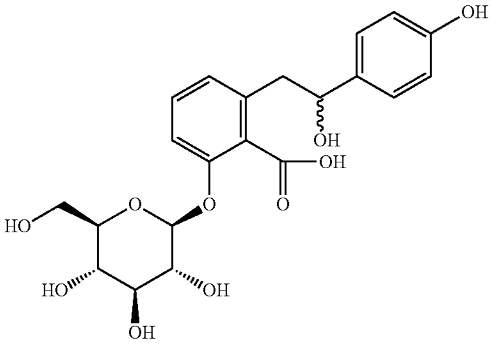

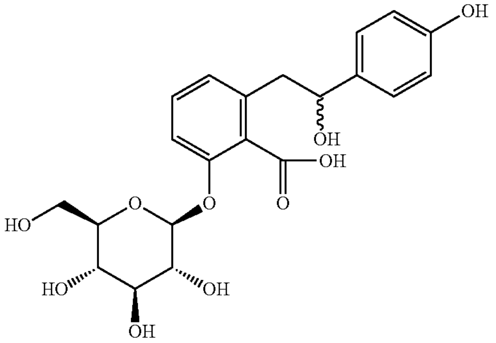

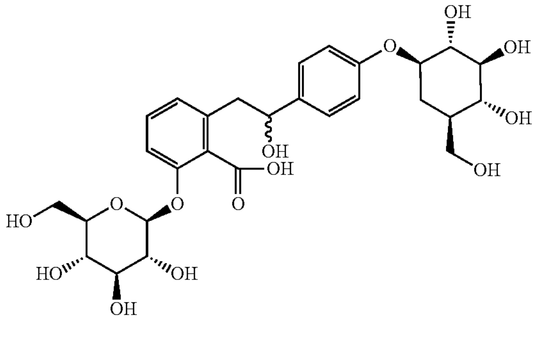

Preferably, the term "hydrangenol" only describes the aglycon, which is described above. In this case, if an amount of hydrangenol is to be determined, only the aglycon is to be considered if present.

One preferred embodiment relates to the dried plant material according to the invention, wherein the dried plant material has a residual moisture of less than 20 wt. %, preferably of less than 10 wt. %, dependent on the total amount of the dried plant material.

EXAMPLES

Figure 1:
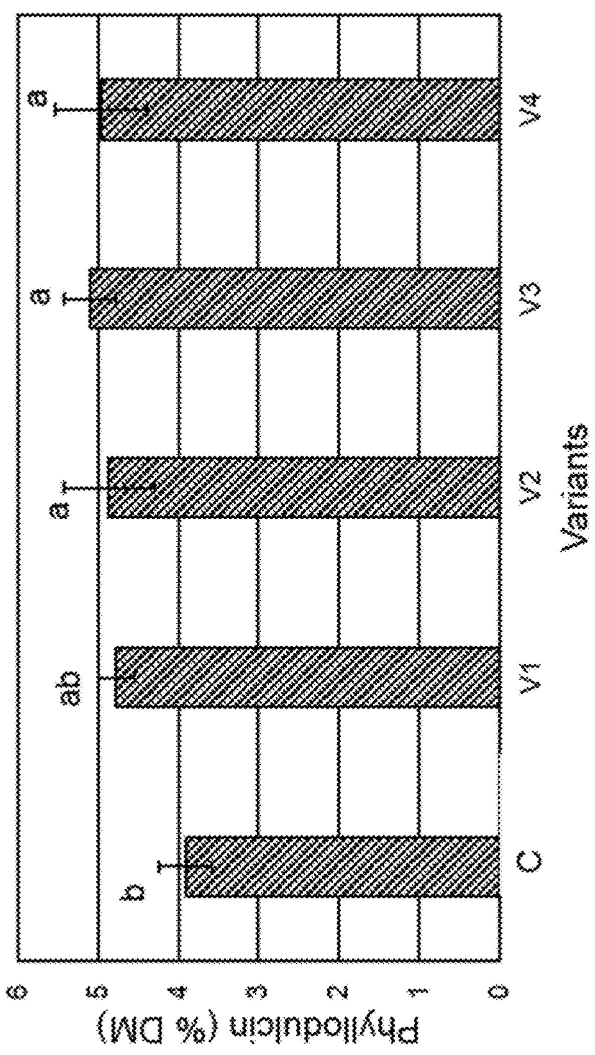
FIG. 1 shows the phyllodulcin content (+/− standard deviation, aglycon, determined after fermentation of the dried and re-humidified young leaves with UPLC) after treatment with different concentrations of methyljasmonate (MeJ): directly after MeJ application; C=control: 0 mM; V1: 0.1 mM, V2: 0.5 mM, V3: 1 mM; V4: 10 mM MeJ (n=24 m p=0.01; different characters means statistical significance).

Example 1: Quantification of Phyllodulcin and Hydrangenol Equivalents

For the quantification of phyllodulcin and hydrangenol equivalents, the sampled leaves were dried at 40° C. for 72 h. Subsequently, samples were homogenized using a mortar, moistened and fermented before being analyzed. Fermentation was carried out by adding water (200 μL) and finally stopped with methanol (1800 μL), followed by ultrasonic extraction for 30 minutes and filtration (membrane filter Chromafil XtraPTFE-20/25). UPLC analyses of samples were performed on a Waters Acquity UPLC® I-Class System equipped with an Acquity UPLC &A PDA detector and a commercially available reversed phase C18 column (Luna Omega 1.6 μm Polar C18 50×2.1 mm). A binary solvent system consisting of acidified water (0.1% formic acid) and acetonitrile was used. Detection wavelength was at 254 nm and chromatographic data were processed by Empore™ 3 Pro 2010.

Example 2: Cultivation of *Hydrangea macrophylla* ssp. *serrata* "Oamacha" Treated With Methyl Jasmonate Rooted cuttings (propagated by the company Kötterheinrich, Lengerich) were placed in a greenhouse of the experimental farm of the Osnabrück University of Applied Sciences, Campus Haste (Department of Agricultural and Landscape Architecture). After one week of acclimatization, the plants were potted in 13 cm pots (capacity about 1 liter) filled with clay substrate from Klasmann-Deilmann GmbH. The substrate consisted of 80% peat as well as clay and a base fertilization of 210 mg nitrogen, 150 mg phosphate, 270 mg potassium, 100 mg magnesium and 150 mg sulfur per liter, as well as trace elements. The plants were placed in a quadrangle with 56 plants/$m^2$ and the ventilation was set to 18° C. at night and 20° C. during the day.

Six weeks later, 25 experimental plants were selected and placed on a table with a fleece mat and MyPex film in the experimental design.

Due to the high outdoor temperatures and high irradiation, the greenhouse cell was shaded throughout the experiment. Before and during the experiment, the plants were watered manually. In addition, the liquid fertilizer Ferty 3 Mega from Planta Düngermittel GmbH was applied once a week at a concentration of 0.5 wt.-% as a foliar application during the entire cultivation period, with the exception of the trial period.

Afterwards, the plants were exposed to different concentrations of methyl jasmonate. Leaf samples were taken from all plants before the first methyl jasmonate application in order to exclude the possibility that the plants differed a priori with respect to their phyllodulcin content and to ensure that this previous (invasive) sampling of the plants (i.e. clipping off the leaves) did not bias the results.

It could be observed that the phyllodulcin content increases after application of different concentrations of methyl jasmonate (FIG. 1).

Example 3: Cultivation of *Hydrangea macrophylla* ssp. *serrata* "Amagi Amacha" in a Hydroponic System The starting material for the hydroponic trials are plants of *Hydrangea macrophylla* ssp. *serrata* of the genotype "Amagi Amacha". The selected genotype comes from the tea hydrangea collection of the company "Kötterheinrich Hortensienkulturen" in Lengerich. After the seedlings were rooted, 75 plants of the genotype "Amagi Amacha" were potted into the agrivermiculite substrate of the company Floraguard and transferred into a hydroponic system. This hydroponic system is a nutrient film technique system (NFT). This technique describes a hydroponic system that supplies water and nutrients to the plants through a thin nutrient film.

After the seedlings had acclimatized, these plants were supplied with the fertilizer solution Hakaphos® blau (10 wt.-% nitrogen, 4 wt.-% phosphate, 7 wt.-% potassium and 2 wt.-% magnesium) from Compo Expert.

For the first five weeks, the plants were cultivated in the NFT system for 24 h with a 0.1 wt.-% Hakaphos® blau nutrient solution and a pH of 5.8. After another two weeks, the nutrient solution was increased to 0.2 wt.-% Hakaphos® blau. Afterwards, YaraTera™ KRISTA MAG (magnesium nitrate flakes, low chloride, sulfate free, fully water soluble, 15 wt.-% MgO) was added to the 0.2 wt.-% Hakaphos® blau. The pH was maintained at 5.8 for the entire time.

At an average temperature of 18-22° C. and humidity of about 60%, plants were illuminated for 16 hours with the P1-500-VIS LED lamp from Future LED® at 238 μmol/($m^2$*s) (sunlight equivalent PAR). A watering treatment with Neudomük® (Neudorff company) against fungus gnat larvae was applied in the third week of culture. Likewise, the plants had to be treated against aphids and spider mites in the fourth week of culture, here the agents Vertimec Pro® from Syngenta and Spuzit® from Progema, both acaricides and insecticides with contact and feeding effect, were used. Regular inspection of the plants for new infestations and diseased leaves was carried out weekly. The cleanliness of the NFT plant and the adjacent area was also controlled.

Plant sampling was conducted at three time points following the fertilizer amendment. The samples were transferred to a drying cabinet in the laboratory for analysis, here the plants were dried at 40° C. for 48 hrs. The plants developed good and formed more and larger roots than observable in the peat substrate of Example 1.

The samples prepared for UPLC measurement were mortared uniformly with a pestle. After mortaring, a representative sample was weighed into a cap (2 mL), on average between 10 mg and 17 mg. Then 0.2 mL of water was added and the sample was incubated for 2 h at 40° C. Afterwards, 1.8 mL of methanol was added to the sample and in a further step, the sample was extracted in an ultrasonic bath for 30 min. After extraction, the sample had to be passed through a 0.2 μm membrane filter before loading into UPLC. Quantification of hydrangenol (HG) and phyllodulcin (PD) was determined by UPLC with external calibration in mg/mL.

Figure 2:
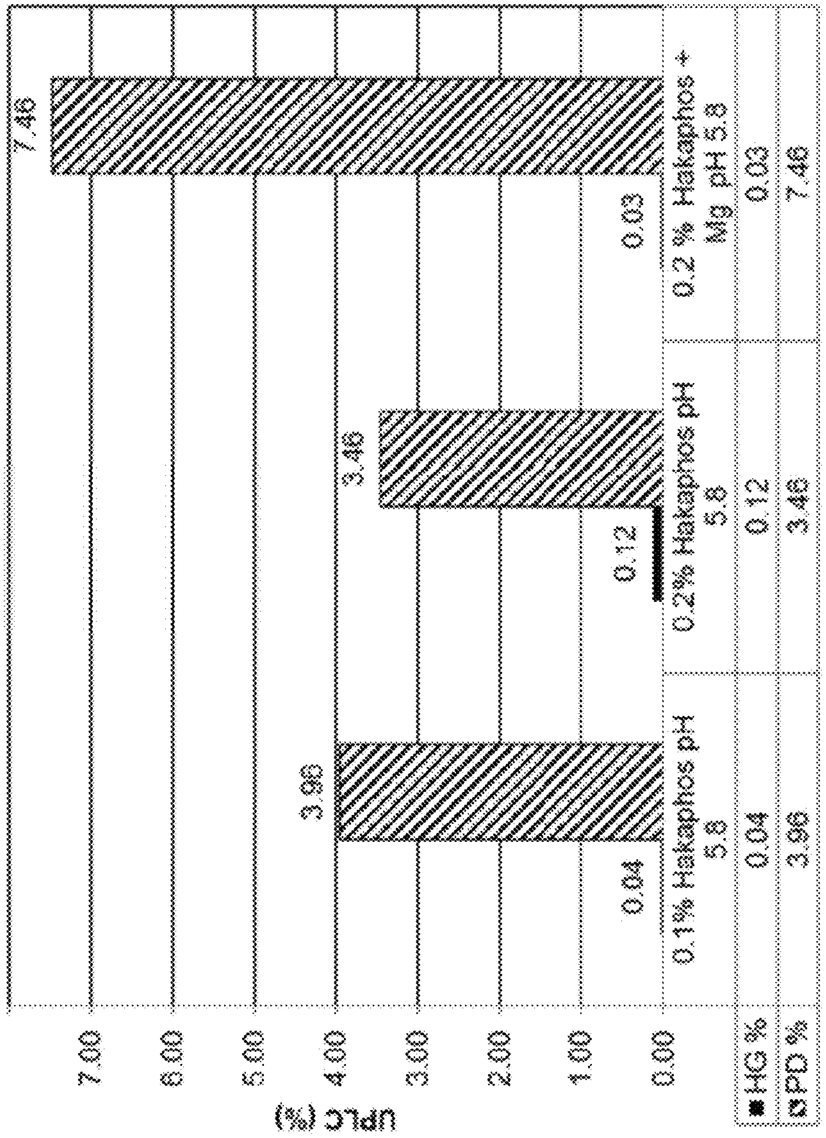
FIG. 2 shows the influence of targeted fertilization and cultivation in the hydroponic system with the genotype Amagi Amacha.

The detection of the substances was carried out via the rentention time and by means of a UV detector. The results can be seen in FIG. 2.

Example 4: Phyllodulcin Accumulation After Repeated Methyl Jasmonate Application 15 plants (or 90 plants for trials with nine times of methyl jasmonate application) of "Oamacha" hydrangeas cultivated as described in Example 3, were treated at different time points (one time, three times, five times, seven times and nine times) with 5 mM methyl jasmonate. It should be tested, how many methyl jasmonate applications it takes to reach a "saturation point" beyond which further applications have no significant effect on the phyllodulcin content in the dry matter.

Physiological effects such as leaf weight, growth rate, dry matter, photosynthetic performance, diseases and healthy growth of applications of <10 mM MeJA could not be detected in any of the trials.

Figure 3:
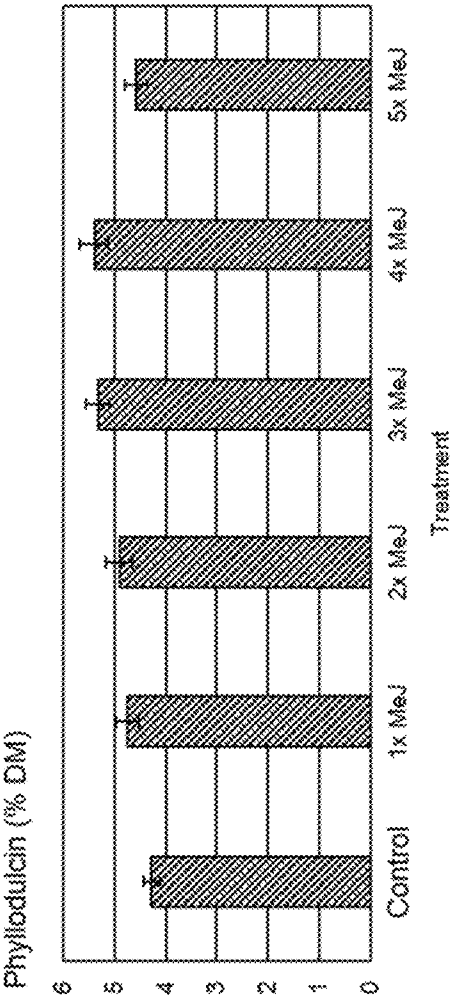
FIG. 3 shows the influence of up to five MeJ-applications (5 mM) in the course of up to 8 days. Plants were sampled one day after the last application, genotype Oamacha.

It is obvious from FIG. 3 that more than one methyl jasmonate application has a beneficial influence on phyllodulcin content in the dry matter of the leaves. These beneficial effects could be validated in another experiment in 2020 by applying MeJ a total of nine times as shown in FIG. 4, using 90 plants in each group.

Figure 4:
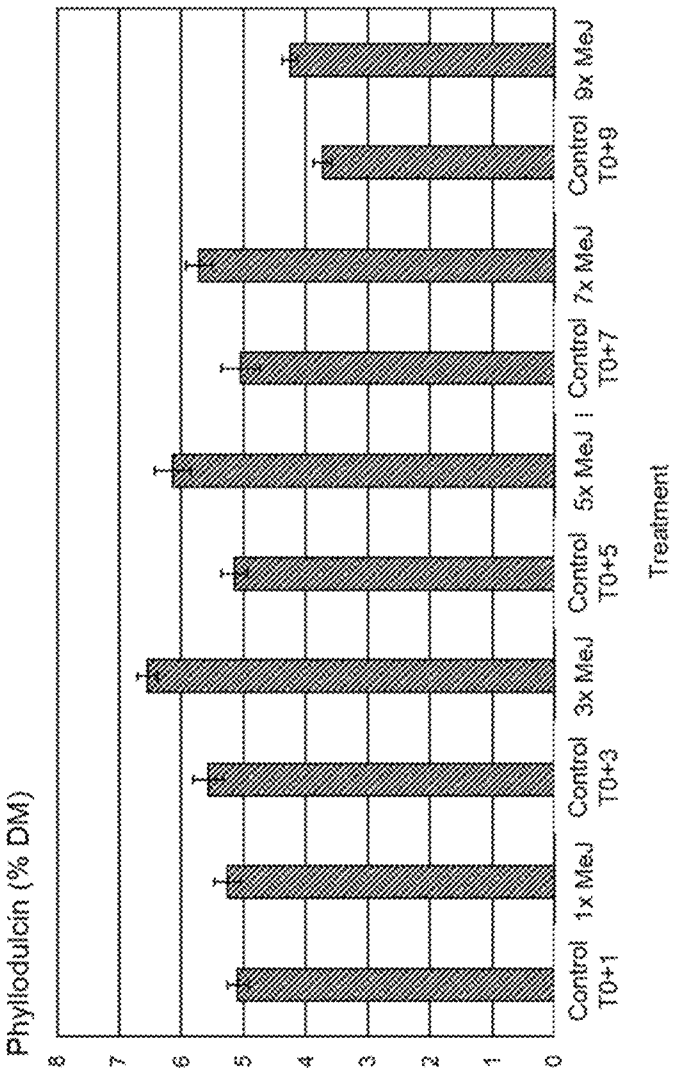
FIG. 4 shows the influence of up to nine MeJ-applications. At each sampling date, samples were taken from control and MeJ-treated plants (18 composite samples for each group at each sampling date, except for the last sampling date after nine applications, where 90 individual plants of each group were sampled).

The aforementioned "saturation point" for MeJ-applications is between a total of three to five applications, as can be seen in FIG. 4.

Figure 5:
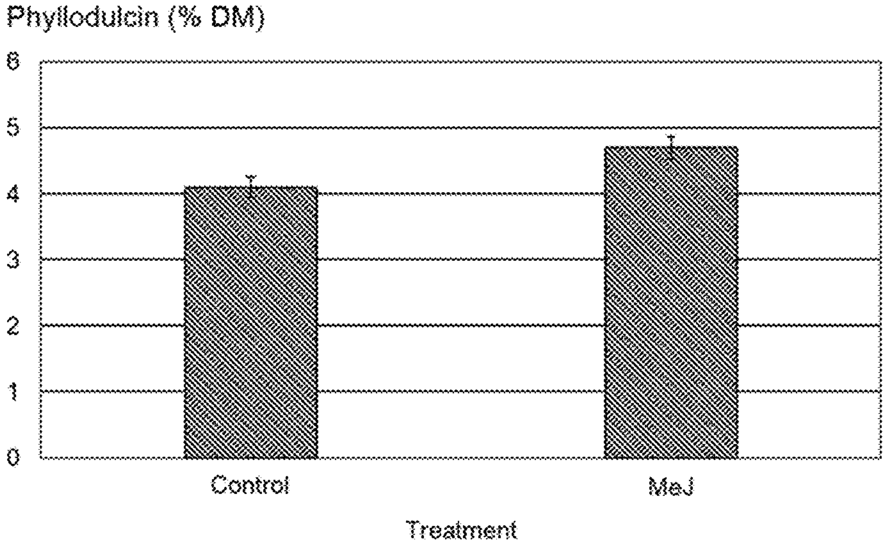
FIG. 5 shows the influence of four MeJ-applications (5 mM solution). Plants were sampled one day after the last application, the genotype is Oamacha.

Once again, these results were successfully confirmed in 2021 using 15 plants in each group, as shown in FIG. 5.

Figure 6:
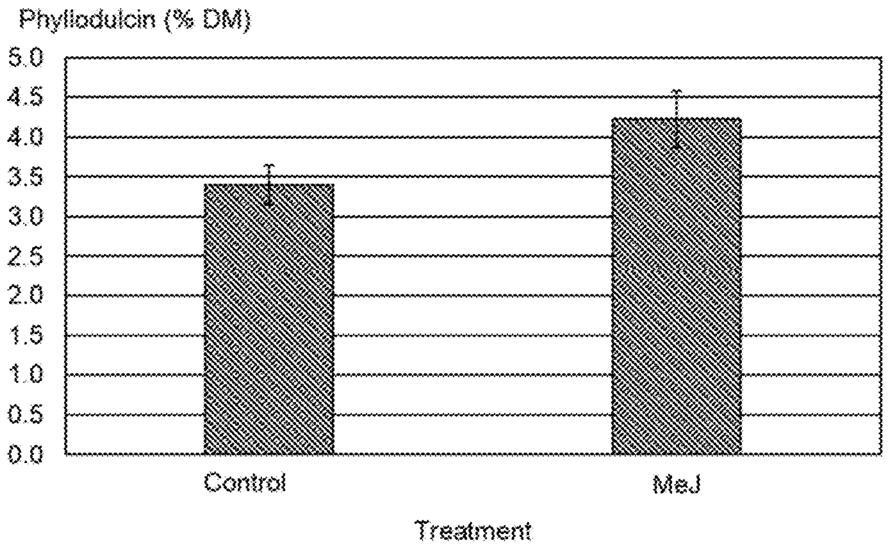
FIG. 6 shows influence of four MeJ-applications (5 mM solution). Plants were sampled one day after the last application, the genotype is Amagi Amacha.

The beneficial effects of MeJ-applications on the phyllodulcin content in the dry matter of the leaves were also shown using another genotype (Amagi Amacha) in 2020 (sampling of 50 individual plants of each group) as shown in FIG. 6.

Figure 7:
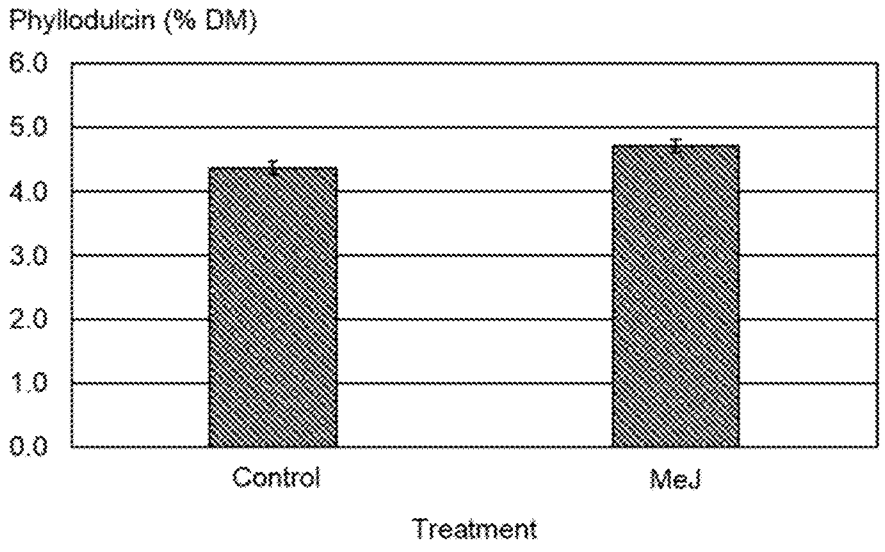
FIG. 7 shows the influence of four MeJ-applications (5 mM solution). Plants were sampled one day after the last application, the genotype is Amagi Amacha.

Once again, in 2021 by sampling 15 individual plants of each group, the results shown in FIG. 6 were replicated as can be seen from the results shown in FIG. 7.

Example 5: Phyllodulcin Accumulation After Combined UV-A Treatment and Methyl Jasmonate Application In the same manner as already described, 64 plants (genotype 'Oamacha') were cultivated in a greenhouse. Four groups were randomly composed, comprising 16 plants each. One group was cultivated under normal conditions (no artificial light, no MeJ-applications). Another group was cultivated under additional artificial light (PPF: 100-130 μmol/s) using Sanlight M30 modules. The other two groups were cultivated under modified Sanlight M30 modules, which provide an additional 5.49% UV-A light-faction (UV-A peak at 375 nm, PFF 300-400 nm: 3.5 μmol/s; total PPF measured at the height of the plants: 100-130 μmol/s).

One of those two groups was also treated four times with MeJ in the same manner as already described. The cultivation of all four groups under these conditions lasted seven days, before the first samples were taken.

Figure 8:
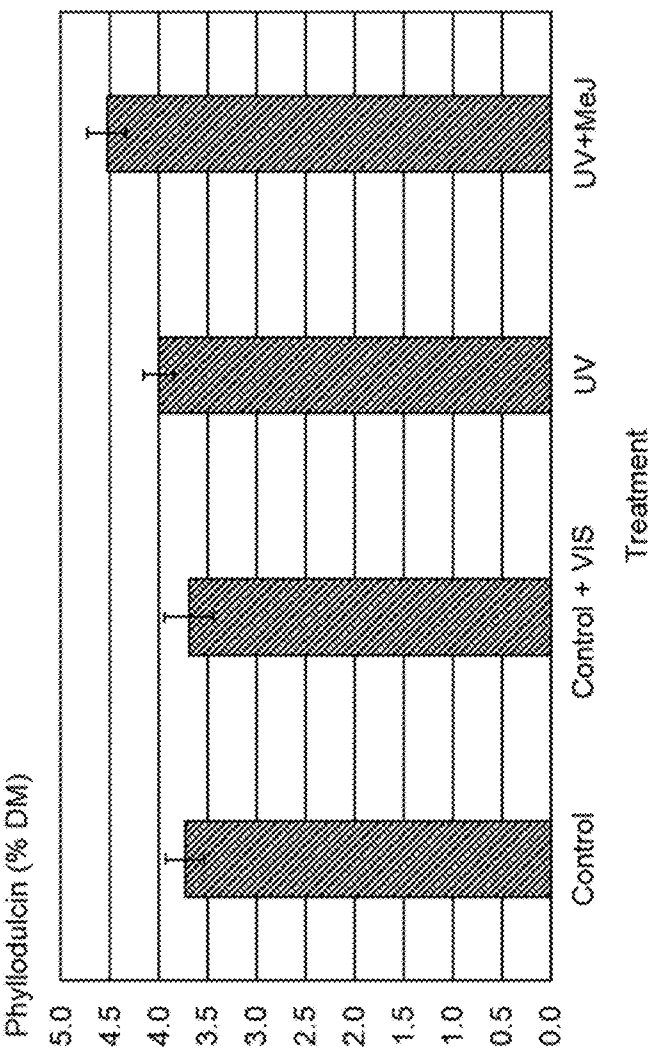
FIG. 8 shows the influence of UV-A light and MeJ-applications (5 mM solution). Plants were sampled one day after the last application.
Figure 9:
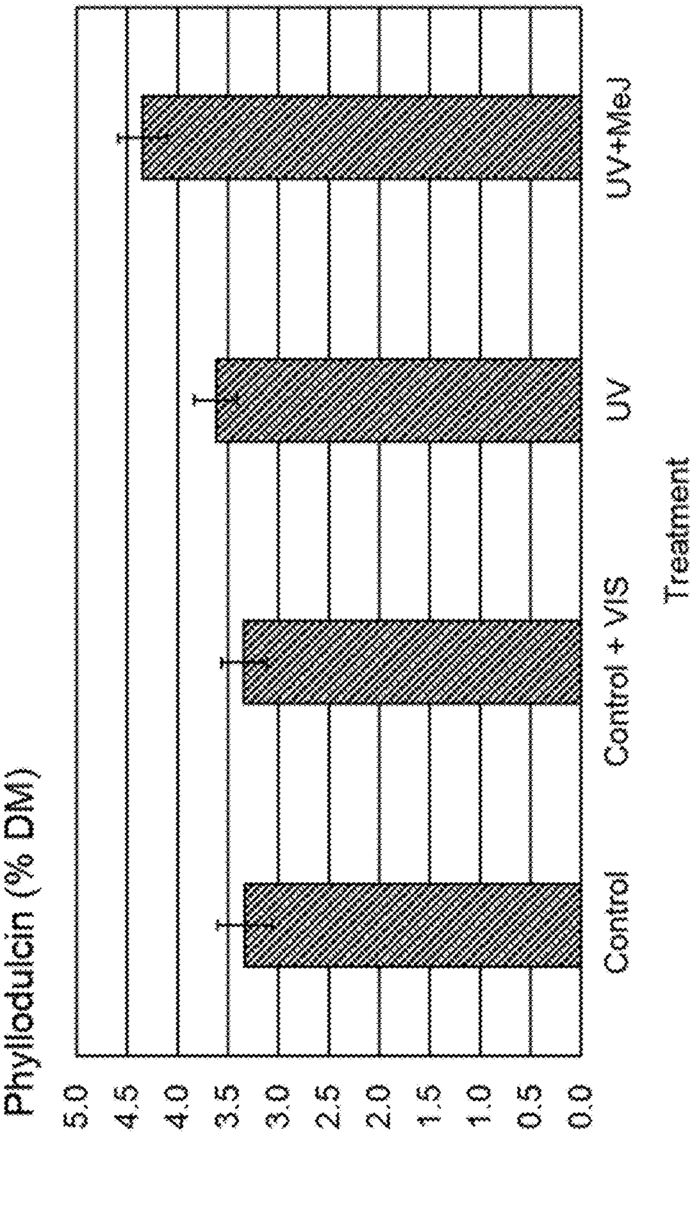
FIG. 9 shows the influence of UV-A light and MeJ-applications (5 mM solution). Plants were sampled three days after the last application.
Figure 10:
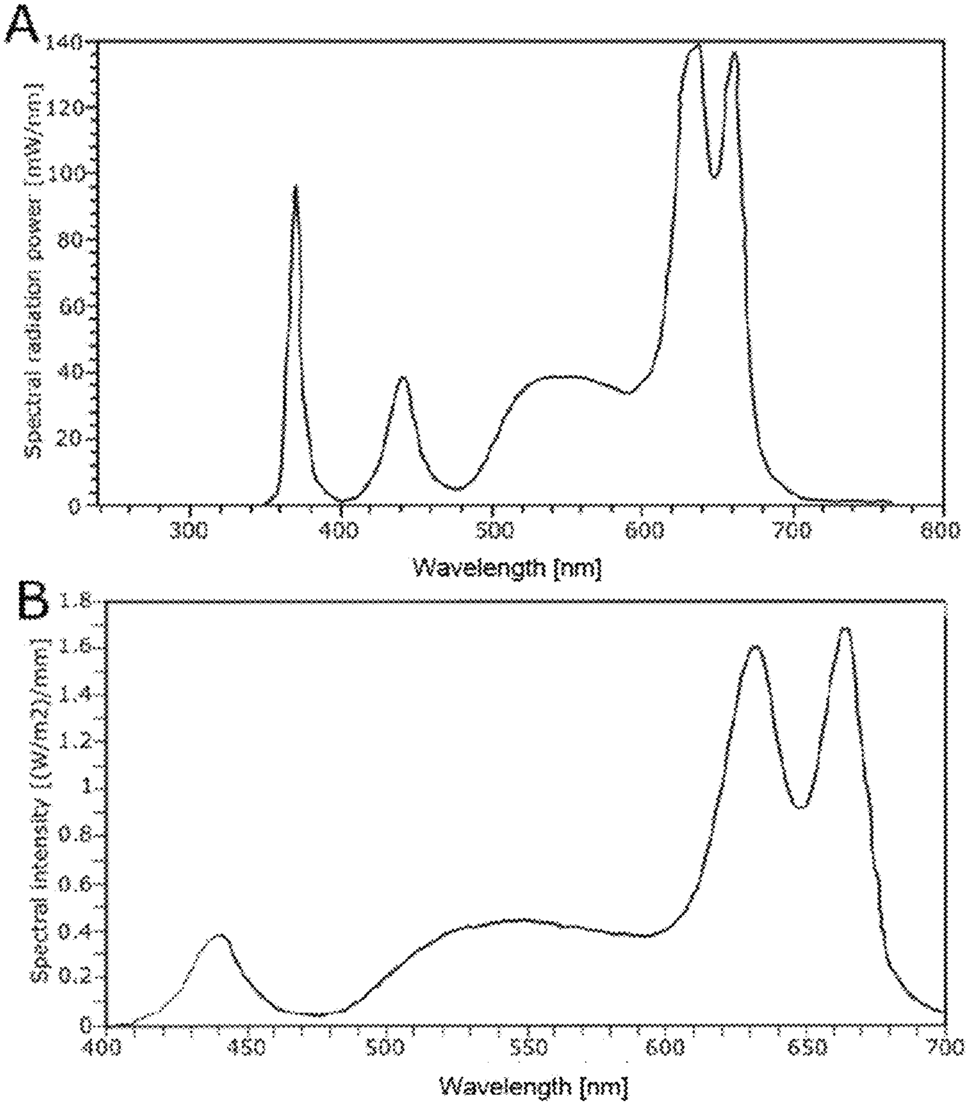
FIG. 10 shows spectral intensity of the LED panels with UV-A peak (A) vs. the wavelength of the used LED panels without UV-A peak (B).

From the results shown in FIG. 8 it is concluded, that especially UV+MeJ has a beneficial effect on the phyllodulcin content in dry leaves and that the combination of UV and MeJ treatment reduces the transient nature of a MeJ-induced elevated phyllodulcin content before harvest (FIG. 9). For comparison, the spectra of the respective UV-VIS and VIS LED panels used are shown in FIG. 10.

The invention claimed is:

1. A method for preparing dried plant material comprising at least 2.5 wt. % of phyllodulcin equivalents, based on a total weight of the dried plant material, the method comprising:

(a) providing a head or shoot cutting of *Hydrangea macrophylla;*

(b) rooting the head or shoot cutting;

(c) using a hydroponic, aeroponic, or fogponic system, cultivating the rooted head or shoot cutting under filtered or shaded natural light to obtain a cultivated plant, and fertilizing the cultivated plant with 5 to 250 grams of a nutrient solution per 100 L of water, the nutrient solution comprising:

(i) 5 to 15 wt. % nitrogen source, (ii) 2 to 10 wt. % phosphorus source, (iii) 5 to 25 wt. % potassium source, and (iv) 1 to 20 wt. % magnesium source;

(d) harvesting stem or leaves from the cultivated plant after a cultivation period of 20 to 200 days;

(e) drying the harvested stem or leaves at a temperature of 20 to 110° C.; and (f) obtaining the dried plant material comprising at least 2.5 wt. % of phyllodulcin equivalents.

2. The method of claim 1, wherein the *Hydrangea macrophylla* is *Hydrangea macrophylla* ssp. *serrata.*

3. The method of claim 1, wherein the *Hydrangea macrophylla* ssp. *serrata* is a variety selected from Oamacha, Amacha, Amagi-Amacha, and hybrids or breeds thereof.

4. The method of claim 1, wherein the cultivated plants are exposed to artificial stress at least once during cultivation.

5. The method of claim 4, wherein the artificial stress is selected from targeted UV light exposure, chemical stress, or a combination thereof.

6. The method of claim 5, wherein the artificial stress is exposure to jasmonate.

7. The method of claim 6, wherein the cultivated plants are exposed to jasmonate by foliar application of the jasmonite, by adding jasmonate to water used to water the plant, or by application of the jasmonite in a gaseous form.

8. The method of claim 6, wherein the cultivated plants are exposed to 0.1 mM to 10 mM of the jasmonite.

9. The method of claim 1, wherein the rooting of the head or shoot cutting is carried out in a substrate that is free from soil and peat.

10. The method of claim 9, wherein the substrate is selected from vermiculite, rock wool, coconut fiber, perlite, pon, seramis, volcanic ash, volcanic ash granules, *Miscanthus* fiber, zeolith, lava, pumice, or mixtures thereof.

11. The method of claim 1, wherein the cultivated plant is cultivated at a temperature of 15 to 30° C.

12. The method of claim 1, wherein the cultivated plant is cultivated with artificial illumination for 12 to 19 hours per day.

13. The method of claim 1, wherein a plurality of cultivated plants is cultivated and wherein the plurality of cultivated plants is cultivated with a planting density of 25 plants/m2 or less.

14. The method of claim 1, wherein the cultivated plant is cultivated in an ebb and flow, nutrition film, drip irrigation, trickle irrigation, deep water, aeroponic, or aquaponics system.

15. The method of claim 1, wherein the harvesting of stem or leaves from the cultivated plant in (d) is repeated at least once, wherein each harvest is at least 20 days after an immediately prior harvest.

16. The method of claim 1, wherein the stem or leaves harvested (d) and dried in (e) are divided into leaf or stem material by air separation, air floating, or air sieving, to obtain a plant material comprising at least 75 wt. % of leaf material.

17. Dried plant material obtained by the method of claim 1.

18. The dried plant material of claim 17, wherein the dried plant material comprises at least 2.5 wt. % of phyllodulcin equivalents and less than 2.0 wt. % of hydrangenol equivalents, based on the total weight of the dried plant material.

19. The dried plant material of claim 18, wherein the dried plant material comprises less than 20 wt. % of residual moisture, based on the total weight of the dried plant material.

* * * * *